Nov. 12, 1929.  H. D. COLMAN  1,734,998
AUTOMATICALLY CONTROLLED CLUTCH
Original Filed Sept. 10, 1917    2 Sheets-Sheet 1
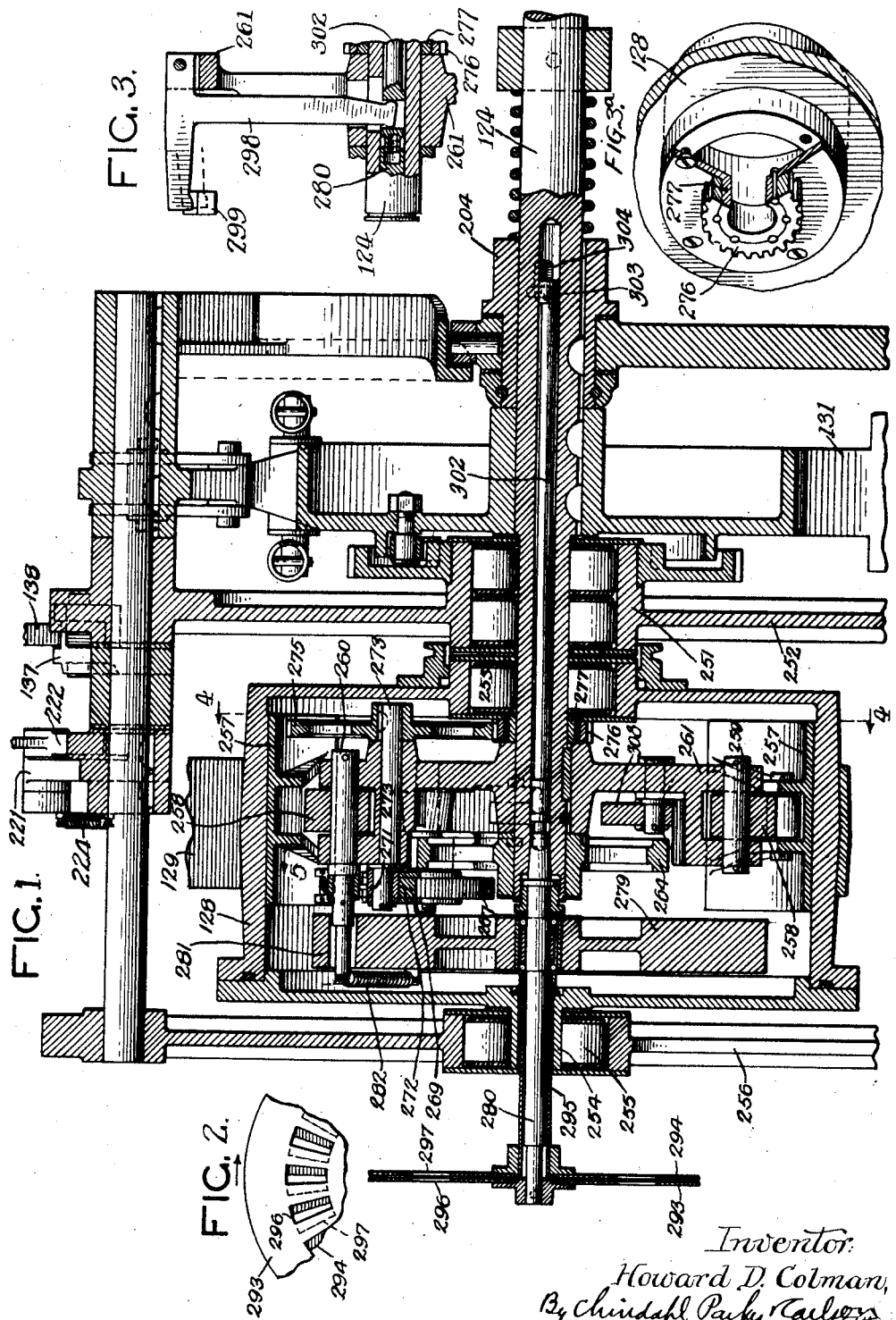

Nov. 12, 1929. H. D. COLMAN 1,734,998
AUTOMATICALLY CONTROLLED CLUTCH
Original Filed Sept. 10, 1917  2 Sheets-Sheet 2
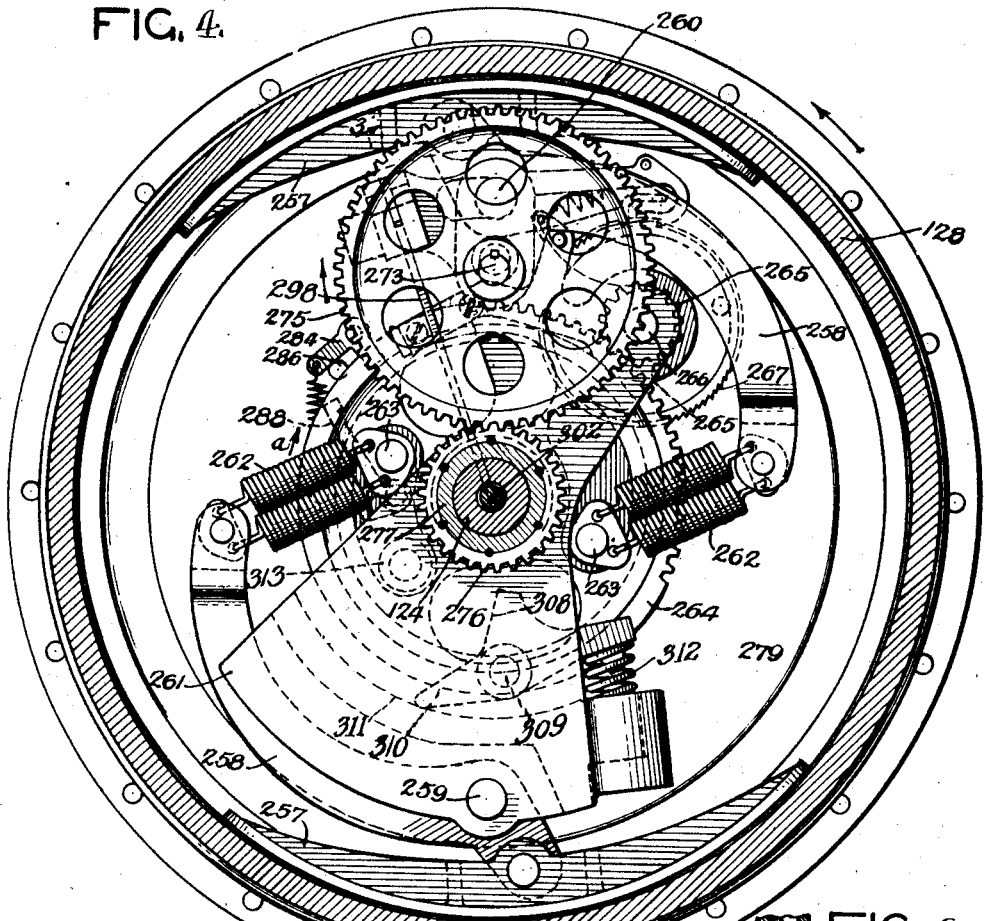
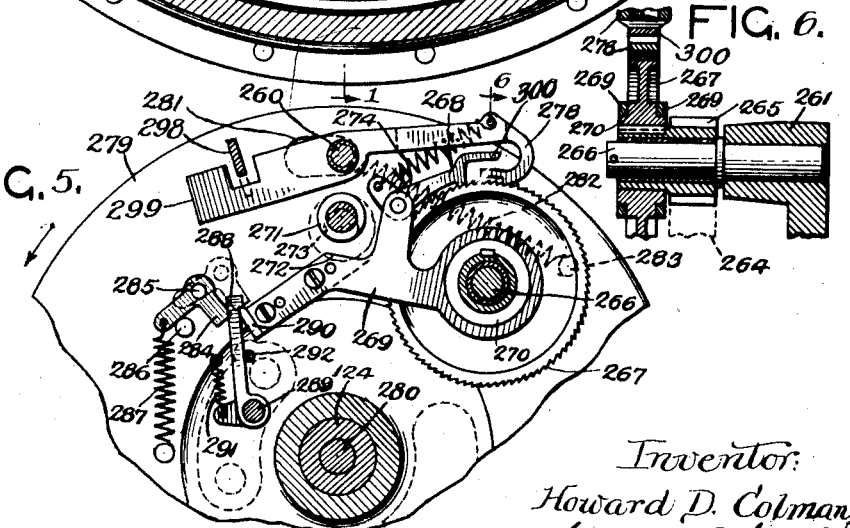
Inventor:
Howard D. Colman,
By Churchill Parker Carlson
Attys.

Patented Nov. 12, 1929

1,734,998

UNITED STATES PATENT OFFICE

HOWARD D. COLMAN, OF ROCKFORD, ILLINOIS

AUTOMATICALLY-CONTROLLED CLUTCH

Original application filed September 10, 1917, Serial No. 190,502. Divided and this application filed June 23, 1927. Serial No. 200,873.

The object of this invention is to produce a clutch which is automatically controlled so as to prevent excessive acceleration. In my copending application Serial No. 190,502 filed September 10, 1917, (of which the present application is a division), I have shown the invention is embodied in a clutch for driving a warper, but it should be understood that the invention is applicable to various types of machines.

In the accompanying drawings, Figure 1 is a vertical sectional view through a clutch embodying the features of my invention, the view being taken upon the plane of dotted line 1 of Fig. 4.

Fig. 2 is a fragmental side view of a device to indicate whether or not the acceleration-controlling mechanism is operating properly.

Fig. 3 is a section on line 3 of Fig. 4.
Fig. 4 is a section on line 4—4 of Fig. 1.
Fig. 5 is a section on line 5 of Fig. 1.
Fig. 6 is a section on line 6 of Fig. 5.

In the drawings, 124 denotes a shaft which is driven by means of a clutch or drive-head comprising a driving pulley or drum 128 mounted upon the shaft 124. 129 is a drive-belt extending around the drum 128 for constantly rotating the latter.

The shaft 124 may be supported in any preferred way, as by means including a roller bearing 251 (Fig. 1), said roller bearing being provided in a bracket or frame member 252. The drum 128 is supported at one side upon the shaft 124 through a roller bearing
253. The other side of the drum is provided with a hub 254 which is mounted in a roller bearing 255 carried by a bracket or frame member 256. Power is transmitted from the drum 128 to the shaft 124 to drive the warp beam at high speed through means including two friction shoes 257 (Figs. 1 and 4) arranged to engage the inner periphery of the drum 128. Each shoe 257 is pivoted to the short arm of a bell-crank 258, said bell-cranks being pivoted at 259 and 260 to a bracket 261 rigidly fixed to the shaft 124. The other arms of the bell-cranks 258 are connected through coiled contractile springs 262 to diametrically opposite pins 263 upon a gear wheel 264, said gear wheel being loosely mounted on the shaft 124. Fig. 4 shows the friction shoes 257 as pressed against the drum 128, the wheel 264 having been turned in the direction indicated by the arrow $a$ to press the shoes against the drum.

The means for turning the gear wheel 264 to force the friction shoes 257 against the drum 128 comprises a pinion 265 meshing with the gear wheel 264 and rotatably mounted upon a stud 266 fixed in the bracket 261. Rigid with the pinion 265 is a ratchet wheel 267 which is arranged to be rotated by means of a dog 268 pivoted upon an arm 269 which is loosely mounted on the hub 270 of the ratchet wheel 267. The arm 269 is swung in the direction to cause movement of the ratchet wheel by means of an eccentric or crank roller 271 arranged to bear against the surface 272 of the arm 269, said crank roller being fixed upon a shaft 273 (Fig. 1) which is rotatably mounted in the bracket 261. The arm 269 is swung in the opposite direction by means of a spring 274 (Fig. 5). The shaft 273 is rotated by means of a gear wheel 275 and a pinion 276, said pinion being fixed to a sleeve 277 (Fig. 3$^a$) which is rigidly secured to the drum 128 and surrounds the shaft 124. The means for locking the ratchet wheel 267 against reverse rotation comprises a dog 278 (Fig. 5) mounted upon the pivot pin 260. The spring 274 tends to hold the feeding dog 268 and the locking dog 278 in engagement with the ratchet wheel.

Means is provided to prevent the friction shoes 257 from being pressed against the drum 128 with such force as to cause excessively rapid acceleration. This means comprises an inertia wheel 279 (Fig. 1) which is rotatably mounted upon a spindle 280, said spindle being rigidly secured to the shaft 124 in axial alinement with the latter. As shown in Fig. 1, the inner end of the spindle 280 is tapered at 280$^a$ to fit a tapered opening in the inner end of the shaft 124. Adjacent to the tapered portion of the spindle 280 is a fixed collar 280$^b$. A tubular screw 280$^c$ bears against said collar, said screw engaging screw-threads in the end of the shaft 124. The pin 260 carried by the bracket 261 extends through a slot 281 in the inertia wheel,

A relatively light spring 282 extending between the pin 260 and a pin 283 on the inertia wheel, tends to hold the rear end wall of the slot 281 against the pin 260. While the bracket 261 and the shaft 124 are being accelerated, the inertia wheel 279 lags. Such lagging is utilized to suspend the action of the spring-tensioning dog 268. Referring to Fig. 5: 284 is a stop pawl pivoted to the inertia wheel 279 at 285 and normally held against a stop 286 by a spring 287. If the lagging of the inertia wheel 279 with relation to the bracket 261 and the shaft 124 is sufficient to cause the stop pawl 284 to be relatively moved into the path of the swinging movement of the arm 269 (as shown in dotted lines in Fig. 5), the movement of said arm caused by the spring 274 will be obstructed by said stop pawl, thus rendering the spring-tensioning dog 268 inoperative, increase in acceleration of the shaft 124 being thereby suspended for the time being. If the acceleration should decrease, the spring 282 would be able to turn the inertia wheel until the stop pawl 284 was removed from the path of movement of the arm 269. The spring-tensioning dog 268 would then resume operation. In this manner the inertia wheel 279 controls the operation of the spring-tensioning dog. As the speed of the shaft 124 and the bracket 261 approaches the speed of the drive drum 128, the rate of rotation of the gear wheel 275 upon its axis decreases, and hence the spring-tensioning dog reciprocates more slowly.

It may be here noted that as the speed of the shaft 124 increases, centrifugal force acting upon the long arms of the bell cranks 258 counteracts to some extent the action of the devices that press the shoes against the drum, and thus serves to diminish the acceleration of the shaft 124 in case the acceleration becomes excessive.

Means to be hereinafter described is provided for placing the dogs 268 and 278 in and out of engagement with the ratchet wheel. When the warper or other driven machine is at rest, said dogs are out of engagement with the ratchet wheel, and the shaft 124 and the bracket 261 are, of course, stationary. The pinion 276 rotates constantly with the drum 128 and therefore when the driven machine is at rest the spur gear wheel 275 is constantly rotating and the arm 269 is constantly swinging. When it is desired to set the machine in operation, the dogs 268 and 278 are placed in engagement with the ratchet wheel 267, whereupon the dog 268 commences to turn the ratchet wheel to press the friction shoes 257 against the drum 128. As the machine is accelerated, progressively less slippage occurs between the shoes 257 and the drum 128 until finally, when the machine has been fully accelerated, the bracket 261 is carried around with the drum 128 and there is no relative rotation between the pinion 276 carried by the drum 128 and the gear wheel 275 carried by said bracket. Hence the arm 269 ceases to swing. When the acceleration of the warper has been completed, the spring 282 holds the inertia wheel 279 in the position shown in Fig. 5.

If after the machine has reached the normal winding speed, slippage occurs between the friction shoes and the drum 128 from any cause, as, for example, by reason of breakage of a spring 262 or a dry bearing in the driven machine, the gears 275 and 276 will commence to rotate relatively to each other, thus actuating the spring-tensioning dog 268 and causing additional force to be exerted upon the friction shoes. To prevent such spring-tensioning movement from being continued to such a point as to damage the springs or other elements of the mechanism, I provide a hook 288 (Fig. 5) pivoted at 289 on the wheel 264, said hook being adapted to engage a projection 290 on the arm 269. A spring 291 normally holds the hook 288 against a stop pin 292. If the spring-tensioning movement of the wheel 264 should continue until the hook 288 engages the arm 269, the swinging movement of said arm will be interrupted and the spring-tensioning movement of the wheel 264 will cease.

Since the acceleration-controlling mechanism is enclosed within the drum 128, it may be desirable to provide means for indicating to the operative how said mechanism operates. Such a device is indicated in Figs. 1 and 2, wherein 293 is a disk fixed to the spindle 280, and 294 is a disk located close to the other disk and fixed to a tubular shaft or sleeve 295 fixed to the inertia wheel 279. In each of said disks is formed an annular series of radial slots or sector openings 296 and 297, respectively. When the inertia wheel is lagging, the sectors in one disk are out of register with those in the other disk. When the inertia wheel is not lagging, that is to say, when the rear end wall of the slot 281 (Fig. 5) is held against the pin 260 by the spring 282, the sectors in one disk register with those in the other, the light transmitted through said sectors producing the appearance of a ring of light. The operation of the acceleration-controlling means is made apparent by variations in the brightness of said ring of light.

It will be understood that in lieu of the sectors 297 a series of white fields of the same shape and size as the sectors 296 may be employed.

The means for throwing the high-speed driving mechanism in and out of action comprises a bell crank lever 298 (Figs. 3 and 4) pivoted upon the bracket 261. One arm of the bell crank 298 is arranged to engage an extension 299 of the locking dog 278 (Fig. 5). Said dog is arranged to engage a lug 300 on the spring-tensioning dog 268 to hold said dog out of engagement with the ratchet wheel 267. When the bell crank 298 is swung into engagement with the extension 299 the locking dog and the spring-tensioning dog are moved away from the ratchet wheel. The other arm of the bell crank 298 extends into a slot 301 in a rod 302 extending axially within and slidable longitudinally of the shaft 124. 303 (Fig. 1) is a pin extending through the rod 302 and through diametrically-opposite slots 304 in the shaft 124. The pin 303 is secured to a sleeve 204 which is slidable longitudinally of the shaft 124. Any preferred means, as, for example, that shown in my application Serial No. 190,502, may be employed to slide the sleeve 204 and thus throw the clutch in and out. When the sleeve 204 is moved in the direction to withdraw the dogs 268 and 278 from the ratchet wheel 267, the springs 262 turn the wheel 264 in the direction to remove the pressure from the friction shoes 257. To limit such reverse movement of the wheel 264, I provide a cushioning stop 308 (Fig. 4) pivoted to the bracket 261 at 309. A lug 310 on the stop 308 is normally held against a surface 311 on the bracket 261 by an expansion spring 312. In the unclutching or throwing-out movement of the wheel 264, a roller stud 313 (Fig. 4) on said wheel strike the stop lug 308, whereby said wheels is yieldingly arrested.

To throw in the clutch the sleeve 204 and the rod 302 are moved toward the left (Fig. 1), thereby swinging the bell crank 298 (Fig. 3) away from the extension 299 (Fig. 5) of the locking dog 278, whereupon the spring 274 places the feeding dog 268 and the locking dog 278 in engagement with the ratchet wheel 267. Since the arm 269 is being constantly swung by the crank roller 271 the dog 268 immediately begins to turn the ratchet wheel 267 in the direction to cause the friction shoes 257 to pressed against the inner periphery of the drum 128. The member 261 carrying the friction shoes is thereby rotated, thus causing the shaft 124 to be driven. As slippage between the friction shoes and the drum 128 decreases, the reciprocations of the spring-tensioning dog 268 become slower by reason of the fact that the gear wheel 275 is revolving more and more slowing around the pinion 276. If the acceleration should become too great, the lagging of the inertia wheel 279 will cause the swinging movements of the arm 269 to be obstructed by the stop 284. The clutch thus slowly and uniformly accelerates the shaft 124 until the speed determined by the speed of the drive belt 129 is reached. It may be here stated that the drum 128 contains a suitable quantity of lubricating oil.

I claim as my invention:

1. A drive mechanism having, in combination, a clutch comprising a driving member and a driven member, means for throwing in the clutch including a ratchet wheel carried by the driven member, an arm pivoted on the axis of the ratchet wheel, a dog carried by said arm and arranged to engage the ratchet wheel, means actuated through relative rotation between the driving member and the driven member for swinging the arm, an inertia wheel mounted to rotate on the axis of the clutch and yieldingly connected to the driven member, and a stop on said wheel arranged to obstruct the movement of said arm.

2. A drive mechanism having, in combination, a clutch comprising a driving member and a driven member, means for throwing in the clutch including a ratchet wheel carried by the driven member, an arm pivoted on the axis of the ratchet wheel, a dog carried by said arm and arranged to engage the ratchet wheel, means for swinging the arm, an inertia wheel yieldingly connected to the driven member, and a stop on said wheel arranged to obstruct the movement of said arm.

3. A drive mechanism having, in combination, a clutch comprising a driving member and a driven member, means actuated through relative rotation between said members for throwing in the clutch, manipulative means for initiating action of the throwing-in means, and inertia-operated means for controlling the action of the throwing-in means.

4. A driving mechanism having, in combination, a clutch comprising a driving member and a driven member, means including a dog and ratchet wheel for throwing in the clutch, said dog being actuated through relative rotation between the members of the clutch, manipulative means for placing the dog into and out of operation, and inertia-operated means for controlling the action of the dog.

5. A drive mechanism having, in combination, a clutch comprising a driving member and a driven structure, said structure including a shoe, a part mounted concentrically of the clutch, a connection between said part and the shoe, means for turning said part to press the shoe against the driving member, said means including a ratchet wheel carried by the driven structure, an arm pivoted on the axis of the ratchet wheel, a dog carried by said arm and arranged to engage the ratchet wheel, means actuated through relative rotation between the driving member and the driven member for swinging the arm, and a stop carried by said part for obstructing the movement of said arm.

6. A drive mechanism having, in combination, a clutch comprising a driving member and a driven structure, said structure including a shoe, a part movably carried by the clutch, a connection between said part and the shoe, means for moving said part to press the shoe against the driving member, said means including a ratchet wheel carried by the driven structure, an arm pivoted on the axis of the ratchet wheel, a dog carried by said arm and arranged to engage the ratchet wheel, means for swinging the arm, and a stop carried by said part for obstructing the movement of said arm.

7. A drive mechanism having, in combination, a driver, a shaft, a member fixed to said shaft, means carried by said member to engage the driver, means for actuating said engaging means, said actuating means including a ratchet wheel carried by said member, a dog for turning the ratchet wheel, a crank for operating the dog, a gear wheel for rotating the crank, said gear wheel being carried by said member, a gear wheel meshing with said other gear wheel and driven by said driver, a locking dog for the ratchet wheel, and means for moving said dogs into and out of engagement with the ratchet wheel.

8. A drive mechanism having, in combination, a driver, a shaft, a member fixed to said shaft, means carried by said member to engage the driver, means for actuating said engaging means, said actuating means including a ratchet wheel carried by said member, a dog for turning the ratchet wheel, a part for operating the dog, a gear wheel for actuating said part, said gear wheel being carried by said member, a gear wheel meshing with said other gear wheel and driven by said driver, a locking dog for the ratchet wheel, and means for moving said dogs into and out of engagement with the ratchet wheel.

9. A drive mechanism having, in combination, a shaft, a driver mounted concentrically of the shaft, a member fixed on said shaft, a shoe carried by said member and arranged to engage said driver, a wheel mounted concentrically of the shaft, a connection between said wheel and said shoe, and means for turning said wheel to press the shoe against the driver, said means including a gear wheel fixed to the driver concentrically therewith, and a gear wheel meshing with the first mentioned gear wheel and carried by said member.

10. A drive mechanism having, in combination, a driver, a shaft, a member fixed on said shaft, a shoe carried by said member and arranged to engage said driver, a part mounted concentrically of the shaft, a connection between said part and said shoe, and means for turning said part to press the shoe against the driver, said means including wheels engaging each other, one carried by said member and another fixed to said driver.

11. A drive mechanism having, in combination, a shaft, a driver mounted concentrically of the shaft, a member fixed on said shaft, a shoe carried by said member and arranged to engage said driver, a part mounted concentrically of the shaft, a connection between said part and said shoe, and means for turning said part to press the shoe against the driver, said means including a wheel fixed to the driver concentrically therewith, and a wheel engaging the last mentioned wheel and carried by said member.

12. A drive mechanism having, in combination, a driver, a shaft, a member fixed on said shaft, a shoe carried by said member and arranged to engage said driver, a wheel mounted concentrically of the shaft, a yielding connection between said wheel and said shoe, a ratchet wheel carried by said member, a gear connection between the ratchet wheel and the first mentioned wheel, a dog for turning the ratchet wheel, a crank for operating the dog, a gear wheel for rotating the crank, said gear wheel being carried by said member, a gear wheel meshing with said other gear wheel and driven by said driver, a locking dog for the ratchet wheel, and means for moving said dogs into and out of engagement with the ratchet wheel.

13. A drive mechanism having, in combination, a driver, a shaft, a member fixed on said shaft, a shoe carried by said member and arranged to engage said driver, a part mounted concentrically of the shaft, a yielding connection between said part and said shoe, a ratchet wheel carried by said member and arranged to turn said part, a dog for turning the ratchet wheel, means for actuating the dog, said means including a gear wheel carried by said member, a gear wheel meshing with said other gear wheel and driven by said driver, a locking dog for the ratchet wheel, and means for moving said dogs into and out of engagement with the ratchet wheel.

14. A drive mechanism having, in combination, a driving drum, a shaft, a member fixed on said shaft, a lever pivoted on said member, a shoe carried by said lever and arranged to engage said drum, a wheel mounted concentrically of the shaft, a yielding connection between said wheel and said lever, a ratchet wheel carried by said member, a gear connection between the ratchet wheel and the first mentioned wheel, a dog for turning the ratchet wheel, a crank for operating the dog, a gear wheel for rotating the crank, said gear wheel being carried by said member, a gear wheel meshing with said other gear wheel and driven by said driving drum, a locking dog for the ratchet wheel, and means for moving said dogs into and out of engagement with the ratchet wheel.

15. A drive mechanism having, in combination, a clutch comprising a driving member and a driven member, a part mounted concentrically of the clutch, a connection between said part and the driven member, and means for turning said part to press the driven member against the driving member, said means including two gear wheels meshing with each other, one supported to revolve with the driven member and another fixed to the driving member.

16. A drive mechanism having, in combination, a driver, a shaft, a member fixed on said shaft, an element carried by said member and arranged to engage said driver, means for pressing said element against the driver including a ratchet wheel carried by said member, an arm pivoted on the axis of the ratchet wheel, a dog carried by said arm and arranged to engage the ratchet wheel, means actuated through relative rotation between the driver and said member for swinging the arm, and means for moving the dog into and out of engagement with the ratchet wheel.

17. A drive mechanism having, in combination, a driver, a shaft, a member fixed on said shaft, an element carried by said member and arranged to engage said driver, means for pressing said element against the driver including a ratchet wheel carried by said member, an arm pivoted on the axis of the ratchet wheel, a dog carried by said arm and arranged to engage the ratchet wheel, means for swinging the arm, and means for moving the dog into and out of engagement with the ratchet wheel.

18. A drive mechanism having, in combination, a clutch comprising a driving member and a driven member, a tubular shaft connected to the driven member, means including a dog and ratchet wheel for throwing in the clutch, and means including a rod movable longitudinally in the tubular shaft for placing the dog into and out of operation.

19. A drive mechanism having, in combination, a clutch comprising a driving member and a driven member, a tubular shaft connected to the driven member, means including a dog and ratchet wheel for throwing in the clutch, said dog being actuated through relative rotation between the members of the clutch, and manipulative means including a rod movable longitudinally in the tubular shaft for placing the dog into and out of operation.

20. A drive mechanism having, in combination, a clutch comprising a driving member and a driven member, means actuated through relative rotation between said members for throwing in the clutch, and inertia-operated means for controlling the throwing-in means.

21. A drive mechanism having, in combination, a clutch comprising a driving member and a driven member, means including a dog and ratchet wheel for throwing in the clutch, and inertia-operated means for controlling the action of the dog.

22. A drive mechanism having, in combination, a clutch comprising a driving member and a driven member, means including a dog and ratchet wheel for throwing in the clutch, an inertia wheel yieldingly connected to the driven member of the clutch, and means operated by the inertia wheel for controlling the operation of the dog.

23. A drive mechanism comprising, a closed driving drum, inertia-controlled clutch means within the drum, said means including an inertia wheel capable of lagging, and means without the drum for indicating lagging of said wheel.

In testimony whereof, I have hereunto affixed my signature.

HOWARD D. COLMAN.